April 17, 1956

A. K. ANANDER 2,741,963

PHOTOMECHANICAL CAMERAS

Filed Feb. 3, 1953

INVENTOR.
ANDREW K. ANANDER
BY
Morgan, Finnegan & Durham
ATTORNEYS.

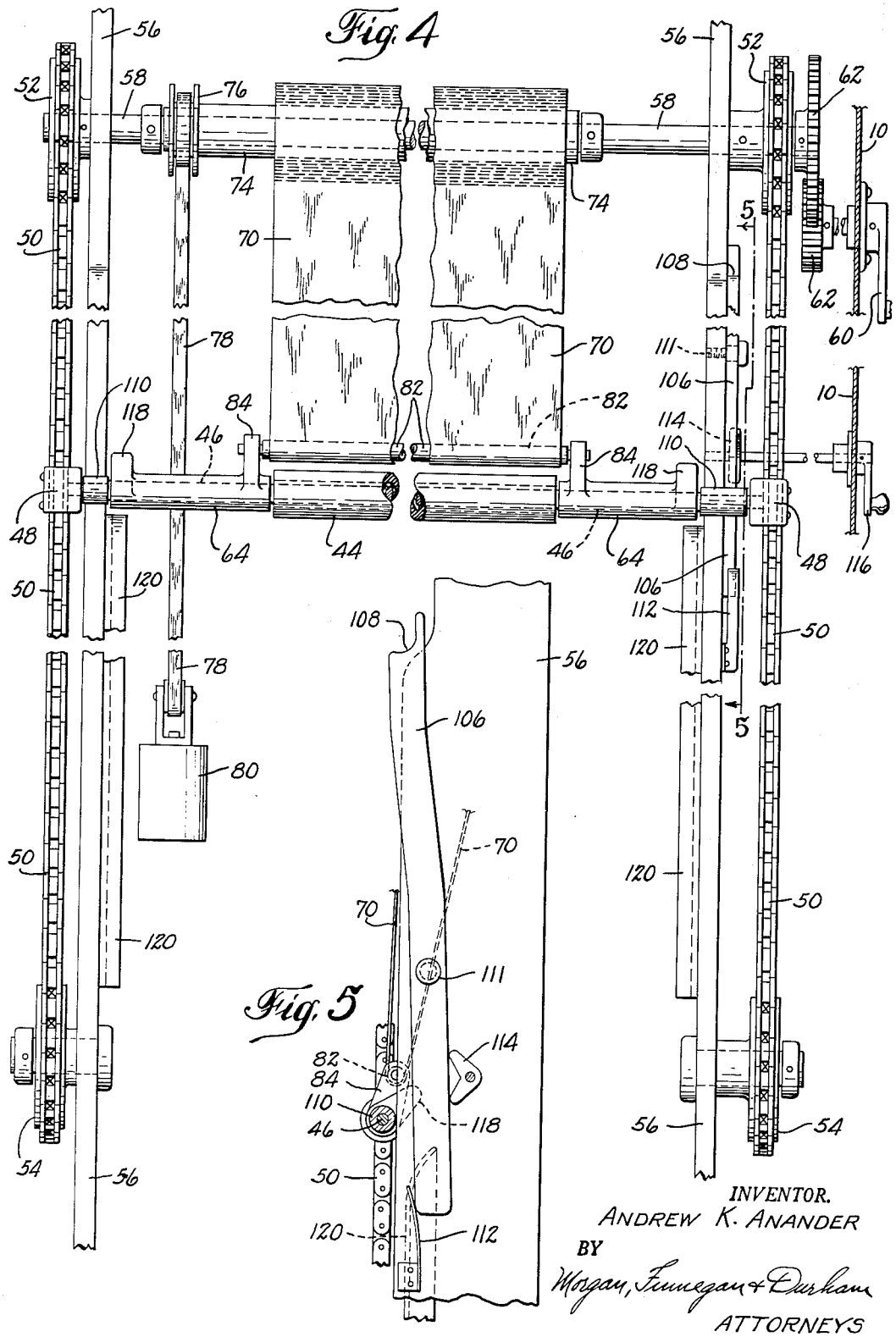

United States Patent Office 2,741,963
Patented Apr. 17, 1956

2,741,963

PHOTOMECHANICAL CAMERAS

Andrew K. Anander, Glen Cove, N. Y., assignor to Powers Chemco, Inc., Glen Cove, N. Y., a corporation of New York Application February 3, 1953, Serial No. 334,923

15 Claims. (Cl. 95—34)

The present invention relates to a novel and improved camera for the reproduction of halftone and line work in photoengraving or other photomechanical processes.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 2:
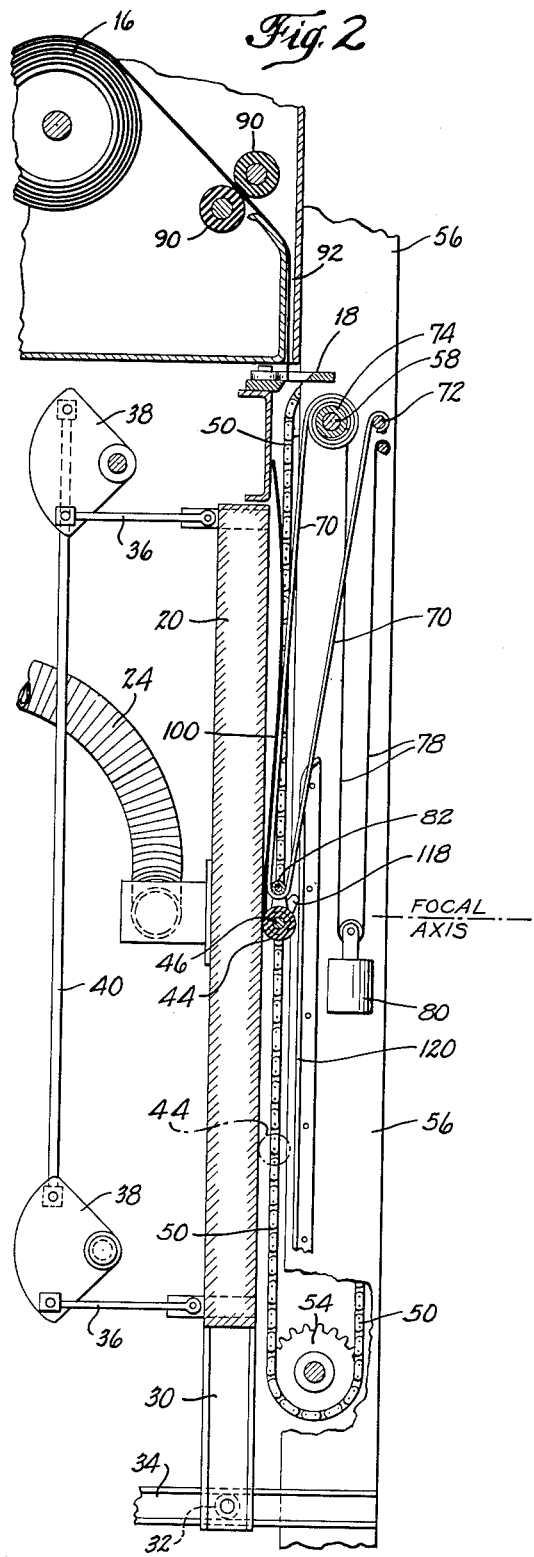
Figure 2 is a schematic sectional view of the illustrative embodiment of the invention showing the film after the proper length has been fed from a film supply, and as the cut length of film is ready to be lowered into position for application to the backing member by means of a supporting roller, as the film is shielded by means of an opaque movable curtain.
Figure 3:
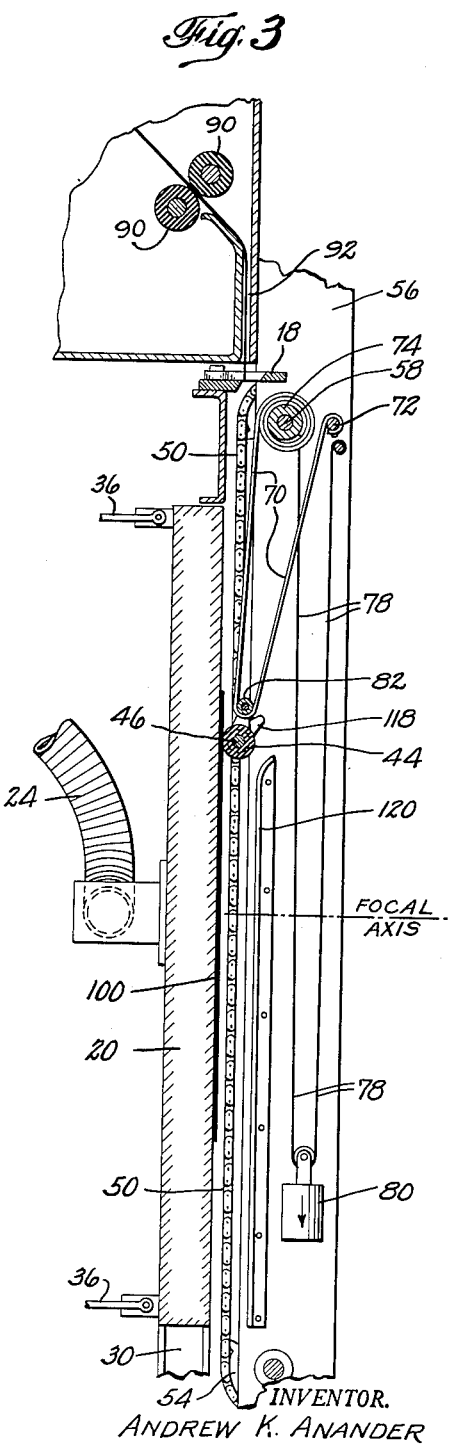
Figure 3 is a similar view showing the various parts after the cut length of film has been properly positioned with reference to the axis of the camera lens and after the supporting roller and opaque curtain have been raised almost to exposure position, the film being held against the backing member by means of the suction which is applied to its back.

Figure 4 is a fragmentary, detailed rear elevation showing the supporting roller, the flexible opaque curtain and associated parts which are shown in side elevation in Figures 2 and 3; and, Figure 5 is a fragmentary side elevation showing the interlock means by which rearward movement of the halftone screen is prevented until the curtain and supporting roller have been moved out of the exposure area and to exposure position.

The present invention is in many respects an improvement upon a "Chemco" photomechanical camera shown and described in the prior patent to F. T. Powers No. 2,282,427, granted May 12, 1942, but in other respects the improvements are of more general application, and may be applied to a wide variety of photomechanical cameras utilizing photographically-sensitized paper or other forms of film which are fed from a relatively long roll of "film," the proper and desired length of film being cut from the supply roll and being moved to exposure position where the cut portion is held during the exposure.

The present invention has for its object the provision of a novel and improved photomechanical or photoengraving camera in which means are provided for insuring proper positioning of the cut-off length of film in the exposure area prior to exposure, and for smoothing the film against the back or supporting member as the film is gripped thereto by suction means, or otherwise. The invention further provides a novel and improved means for shielding the film from exposure until it has been fully positioned thereby giving additional time within which the operator may be sure that the camera shutter has been properly closed and that the camera is otherwise ready for the intended exposure. Still another object is the provision of interlock mechanism by which the backing member cannot be moved into exposure position for the making of a halftone or screen exposure until the supporting roller and opaque curtain have been retracted. The present invention provides a highly efficient, easily and rapidly operated camera which is especially adapted for the production of screen or halftone negatives in which the proper and desired length of flexible film may be accurately positioned for exposure and may then be properly smoothed against the suction backing member without any danger of wrinkles or unevenness, all of these operations being performed while the film is shielded from exposure such as might result from the lens shutter being open, and while the backing member is in its rearwardly spaced position with respect to the halftone screen.

While the invention is especially useful in connection with cameras which are particularly adapted for the production of screen or halftone negatives, in certain respects it is also useful in connection with the production of high grade line work and high grade continuous tone negatives. However, it will be described in detail with respect to a standard form of photoengraving camera in which variable lengths of film are adapted to be fed and severed from a roll or other supply of the sensitized material.

In general, the camera comprises the usual lens, bellows and film supply and suction back or film supporting means, all enclosed, as is usual, in a light-tight housing so that extraneous light is excluded. The film feeding mechanism provides for feeding variable and accurately selected lengths of flexible photosensitive material from a supply downwardly into an area which corresponds approximately to the focal and exposure plane of the camera. As the film is fed downwardly it is fed in front of the film supporting means and when the proper length has been fed it is severed from the main supply and drops by gravity. Its downward travel is limited by a stop which is engaged by the lower straight edge of the severed length of film and preferably comprises a roller held closely adjacent and in front of the backing member, the stop member being vertically movable so that after the film has come to rest the stop may be moved downwardly and then upwardly over the photosensitive surface of the film and urges the film rearwardly against or into close proximity to the backing member. The downward movement of the stop member permits the lower edge of the film to be moved until it has been accurately positioned at the bottom edge of the exposure area, and the movement of the stop member is preferably controlled by an external means, such as a crank, which has a movement correlated to the movement of a crank member by which the film is fed from the film supply. Preferably, the film feeding crank is calibrated with respect to the film lowering crank so that the film feeding crank feeds the desired length of film, and the film is lowered by the stop actuating crank to center the film accurately after it has been severed from supply, so that the roller stop is lowered below the optical axis of the camera a distance equal to only one-half the length of the cut-off length of film.

Means are also preferably provided for holding the main upper portion of the film sheet adjacent the backing surface and for guiding and feeding the film downwardly into engagement with the film-holding stop. The backing member is preferably a suction backing member of standard construction which securely holds the flexible sheet of film against the backing member so that it is uniformly in the focal plane of the camera. The film guiding means is preferably formed as a flexible opaque guide curtain which is normally spaced slightly from the backing member to form a relatively narrow vertically-extending slot through which the cut-off length of film drops to the stop member, the flexible curtain preferably being so arranged that its portion adjacent the supported sheet of film forms a support for the body of the film holding the film closely adjacent to the backing member, and which is fed downwardly with respect to the film as the film stop is lowered.

Means are also provided for rolling up the flexible shielding guide curtain as the supporting roller is moved upwardly, thereby removing both the supporting roller and the shielding curtain from the exposure area.

The backing member is movable bodily towards and away from the exposure plane, and usually from the halftone screen which is usually positioned in front of the focal plane of the camera, and interlock means are provided so that removal of the film supporting stop and the shielding curtain from the exposure area is required before the backing member can be moved forward to exposure position thereby minimizing the risk of faulty exposures.

It will be understood that the foregoing general description and the following detailed description as well are exemplary and explanatory of the invention but are not restrictive thereof.

Referring now in detail to the present preferred and illustrative embodiment of the present invention as shown in the accompanying drawings, the invention is shown as embodied in a photoengraving camera which substantially corresponds in its principal parts to a "Chemco" camera, many of the parts of which will not be described as they do not relate to, nor assist in the understanding of the present invention.

The illustrated camera includes the camera body 10, on the forward portion of which are supported the camera bellows 12, and at the extreme forward portion of which is supported the camera lens 14 which may be moved back and forth to proper exposure position so that the image to be photographed is properly focused on the sensitized material. Within the camera body 10 is supported one or more film supply units, such as the film roll 16 from which the desired length of photographically sensitized film or paper may be fed to be severed by conventional knife mechanism 18, actuated by an external ever 19, so that the desired size of sheet fim may be supported on the forward face of a backing member 20 in a position normal to the axis of the camera lens 14. Between the forward surface of the backing member 20 and the camera lens may be provided the halftone screen 22, which when the backing member is properly positioned will cooperate with the camera lens 14 to form the halftone image to be photographed on the sheet of film. The camera body and bellows are so constructed as is usual, that the film to be exposed is shielded from extraneous light and receives only that light which is admitted through the shuter associated with the camera lens 14.

The camera backing member preferably comprises a vacuum backing member 20 which is relatively rigid and is provided with a foraminated surface towards the lens by which suction may be applied to a sheet of sensitized film to hold the film flat and accurately in the focal plane of the camera. At the rear, the vacuum backing member 20 is provided with a suction hose 24 which is connected to a suction pump of sufficient capacity to develop a suction of several inches of mercury over the entire front surface of the backing member.

Backing member 20 is also mounted to be moved forwardly and rearwardly with respect to the camera lens, always maintaining the front surface normal to the axis of the lens, and is preferably mounted so that this movement may be controlled from an exterior manipulative handle, such as the crank arm 26 which moves over a track member 28 to give an external indication of the position of the backing member with reference to the screen 22, and may also be provided with conventional means for locking the crank 26 in its adjusted position for exposure. The backing member is conveniently mounted for this forward and rearward movement by means of the depending legs 30 provided with rollers 32 which run in longitudinally extending tracks 34 fixed to the bed of the camera and moved by means of the parallel link motion parts comprising the links 36 which are pivoted to the top and bottom of the backing member and at either side thereof and have their rear ends pivoted to pivotally mounted plates 38 which are linked together for simultaneous equal movement by means of the pivoted vertical link 40. The plates 38 are pivotally mounted by means of shafts which extend across the camera and are supported in the sides of the camera body, and the upper ones of the plates 38 are rigidly connected to the crank arm 26 so as to be moved thereby, thus moving all four of the plates 38 and causing a uniform movement of the backing member 20.

Movable up and down over the front surface of the backing member 20 while the backing member is in its retracted or rearward position, is a movable horizontal stop which is preferably in the form of a freely rotatable roller 44 which is adapted to be pressed against the front of the backing member and forms a stop or ledge for engaging the lower edge of a relatively stiff sheet of film so that the upwardly extending sheet of film is supported closely adjacent to the backing member 20. Roller 44 is preferably freely mounted for rotation upon a shaft 46 which is supported at its ends in blocks 48 which are anchored to their respective supporting chains 50, the chains being mounted for simultaneous movement by means of the upper sprockets 52 and the lower sprockets 54, the sprockets being mounted on side frame members 56 and the upper sprockets being interconnected by the shaft 58 so that they may be moved by the external crank 60 through suitable gearing 62, crank 60 being journaled in the exterior casing of the camera. The position of the blocks 48 and roller sleeves 110 are such that they normally tend to urge the roller 44 against the face of the backing member 20, as the sleeves 110 roll against the rear edges of the side frame members 56 parallel to the front face of the backing member 20. Roller 44 is held in its laterally central position by means of the end pieces 64 which will be later described as to their other functions.

The guiding curtain means are provided for guiding and feeding downwardly the sheet of film as it lies in front of or on the backing member 20 comprising flexible means, such as the flexible curtain like sheet 70. This is preferably of opaque black cloth at least as wide as the widest sheet of film to be exposed and which has one of its ends attached to a horizontally extending rod 72 which is anchored at its ends in the frame members 56. The other end of the shielding sheet 70 at attached to a roller 74 which is freely rotatable on the shaft 58 and is connected to a pulley 76 which winds up a flexible strap 78 of tape or metal at the lower end of which is supported a weight 80 of sufficient mass to more than counterbalance the flexible sheet 70, and so arranged that the shielding fabric or curtain 70 at all times is held taut between the rod 72 and the roller 74, it being passed over a roller 82 approximately midway between the roller 74 and rod 72 at a point slightly above the pressure roller 44. Thus the shielding curtain 70 passes downwardly from the rod 72 to the roller 82 and thence upwardly closely adjacent the backing member 20 to the rearward side of the roller 74 on which the curtain is wound by the action of the counterweight 80.

Roller 82 is mounted for free rotation in brackets 84 formed as upwardly extending lugs on the spacing pieces 64 and thus is maintained closely adjacent the front surface of the backing member 20. As the roller 74 is concentric with the shaft 58 on which it is freely rotatable, and the shaft 58 is rotatable in the fixed frame members 56, the rear portion of the curtain 70 forms a downwardly narrowing slot into which film may be fed from a supply to rest in the bite made by the roller 44, with the backing member 20.

Film, or other photosensitive material, usually comprising a sensitive layer coated onto a relatively thick paper base and usually supplied in the form of a roll 16 of the desired width is mounted within an upper portion of the camera case and is adapted to be fed from the supply downwardly through a feed throat 92 past a horizontal knife 18 which is adapted to make a square cut across the film after the forward end of the film has been fed into the narrowing slot between the curtain 70 and the backing member 20. The film material is fed forwardly by means of the feed rollers 90 which are driven in the conventional manner by means of the external crank 96 which is geared to a registering pointer 98 so that the operator may know with certainty exactly how much film has been fed past the knife 18. When the desired length of film has been fed, the knife 18 is actuated, thereby cutting off the desired exact length of film as a sheet 100 and allowing it to drop slightly until its lower square edge rests in the bite of the roller 44. Crank 60 is then turned to lower the roller 44 until it has been lowered below the lens axis a distance equal to one half the length of the film sheet 100, thereby centering the sheet 100 with respect to the lens axis. To facilitate the accurate movement of the roller 44 a scale 101 is provided which shows the proper initial position of the roller 44, while the scale 102 for the pointer 104 driven from crank 60 indicates the corresponding exposure position of the roller 44. Thus, for a 20 inch length of film, crank 60 would be turned until pointer 104 indicated 20 inches on scale 101 thereby showing that the roller 44 was slightly below the fed 20 inch length of film. The crank 60, after cutting the film would then be turned until pointer 60 indicated 20 inches on scale 102, thereby indicating that the film was centered, or that 10 inches was below the optical axis of the camera.

As the roller 44 is lowered, curtain 70 is moved downwardly with respect to the film, thereby insuring that the film is properly seated in the bite made by roller 44 with backing member 20.

After the roller 44 has been lowered to the desired position, the suction pump is started in operation to apply suction through the hose 24 to the backing member 20, after which the roller 44 is raised to its uppermost position which is above the top of the backing member 20. As the roller 44 is raised it presses the film sheet 100 firmly into contact with the backing member 20 in a gradual manner so that irregularities, bucking and possible wrinkling is completely avoided, at the same time insuring that the film sheet 100 is squarely positioned on the backing member 20.

Preferably, and to insure that the backing member 20 may be moved forward into its proper position with respect to the screen 22, and also to insure that the backing member 20 is moved rearwardly before any attempt is made to lower the roller 44 into the initial position shown in Figure 2, detent means are provided as shown in detail in Figures 4 and 5 in which pivoted members 106 are provided, one on each of the vertical frame members 56 which are adapted to engage with rollers 110 mounted at the outer ends of the spacing members 64. Member 106 is formed as a bar which is pivoted on the frame members 56 at 111 and is lightly urged rearwardly at its upper end by means of the leaf spring 112, the upper end, close to knife 18, being notched, as at 108, to provide a detent engageable with one of the rollers 110 so that the member 106 must be moved about its pivots before the roller 44 may be again lowered. Inasmuch as the shaft supporting roller 44 is supported by the chains 50 which are equalized in their movement by the shaft 58, only one detent member 106 need be provided.

Means are also provided for releasing the detent 106 and comprise a pivoted bellcrank 114 to be actuated by an external crank 116, both ends of the bellcrank 114 bearing against the lower portion of the detent member 106 so that rocking crank 116 in either direction causes the detent to be moved in a clockwise direction (Figure 5) thereby releasing the upper end from any possible engagement with rollers 110 on the shaft which supports the roller 44. In case the roller 44 has not been moved to a position at least above the detent upper end, the roller 44 itself will block movement of the backing member into its proper position with respect to the screen 22.

Spacing members 64 are also provided with upstanding ears 118 near their outer ends which are adapted to control the proximity of the roller 82 and the curtain 70 towards the backing member 20, maintaining it closely adjacent the backing member for most of its upward travel and then spacing it a considerable distance from the backing member after the major portion of the film sheet 100 has been securely positioned for exposure by the suction applied through the backing member 20. As embodied, ears 118 normally are urged forwardly by means of the weight 80 which exerts its force through the curtain 70 and roller 82. As the roller 44 is engaged with the film sheet 100 over the lower half of the film sheet and over a substantial portion of the film sheet above the lens axis, the ears 118 are urged rearwardly by means of the track portions 120, which extend vertically and are substantially parallel to the focal plane for the major portion of their length, being rounded forwardly at their upper ends so as to space the roller 82 and its surrounding curtain 70 from the backing member 20 at the upper portion of the travel of the roller 44.

Externally of the camera casing is provided switch means 126 for controlling the operation of the vacuum pump which applies suction to the backing member 20 through the hose member 24.

The operation of the illustrative embodiment may be summarized as follows:

After the camera has been loaded with a film supply 16 of the proper width properly threaded through the rollers 90, the feeding throat 92 and the severing knife 18, the camera is focused by moving the lens 14 to the proper position so that the image of the copy to be reproduced is properly focused on the screen 22 and the backing member 20. The backing member 20 is retracted to its rearward position where it is spaced from the halftone screen 22 by operation of the external lever 26, and the curtain 70 and roller 44 are in the upper position.

The pivoted bellcrank 114 is then rocked by operation of crank 116 as crank 60 is rotated to lower the roller 44 and the curtain doubling roller 82 until the roller 44 has been moved to a central position to position it slightly below the length of film to be fed, this position preferably being indicated by means of the pointer 104 which cooperates with the fixed scale 101. The internal parts of the camera are thus positioned substantially as shown in Figure 2 of the drawings with the portion of the curtain adjacent the backing member 20 forming a downwardly narrowing throat into which film may be fed from the supply past the knife 18.

Assuming that the exposure to be made requires a piece of film 18 inches long and 14 inches wide to be fed from a supply roll of film 16 which is 14 inches wide; crank 96 is turned until the pointer 98 indicates that 18 inches of film have been fed past the knife 18 by rotation of the feed rollers 90. The knife 18 is then actuated by operation of the lever 19 and the severed sheet of film 100 drops to its initial position as shown in Figure 2, where it is supported at its lower end by means of the roller 44 pressed against the front surface of the backing member 20, while the film is prevented from falling forwardly by the curtain 70 which extends upwardly from the roller 82, the roller being urged towards the backing member by engagement of the ears 118 with the track members 120.

Figure 1:
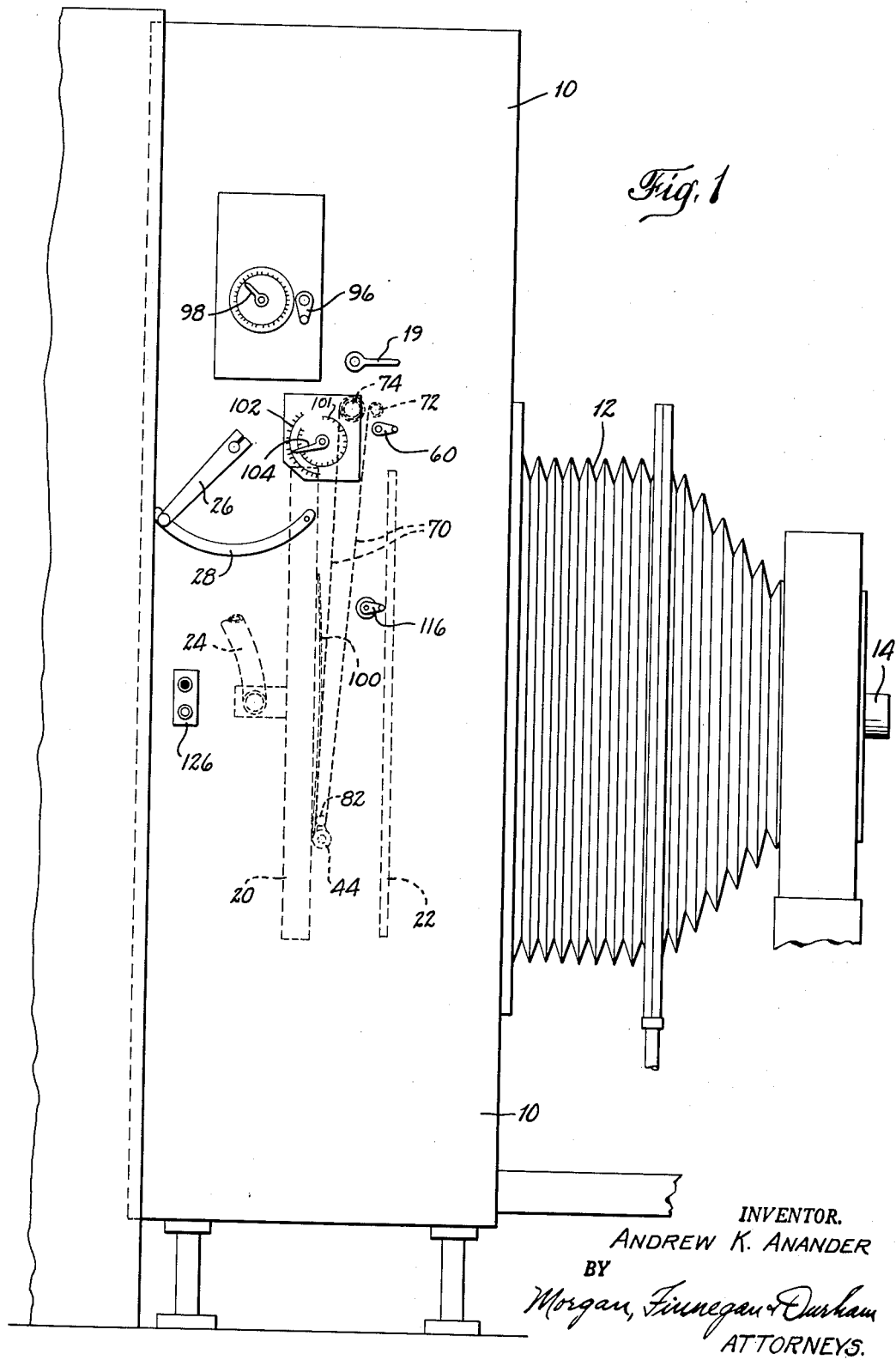
Figure 1 is a side elevation showing a typical and illustrative, fragmentary embodiment showing the means for feeding variable lengths of film or other sensitized material and for applying the fed lengths to a backing member in accordance with the present invention.

The sheet of film 100 is then lowered to exposure position by turning crank 60 until the pointer 104 on scale 102 indicated 18 inches, thereby indicating that the film has been lowered 9 inches below the optical axis, or the proper distance to center the 18 inch piece of film with respect to the focal axis of the lens. This lowering motion lowers both the roller 44 and the curtain roller 82 and the downward travel of the rear reach of the flexible guide curtain 70 insures downward feed of the film, while the track edges of frame members 56 maintain the roller 44 pressed against the surface of the backing member 20. The parts are thus positioned as shown by the dotted lines in Figure 1.

Switch 126 is then operated to apply suction to the hose 24 and through it to the forward surface of the backing member 20. Crank 60 is then turned in the opposite direction so that the roller 44 is moved upwardly over the sheet of film, weight 80 also serving to roll up the curtain 70 as the roller 82 is simultaneously raised. As the roller 44 is raised, the film remains in its vertical position and is gradually and progressively smoothed against the backing member 20 thereby insuring that it is brought into suction-holding relation to the surface of the backing member 20 without buckling, wrinkling or other unevenness, and also insuring that it maintains its original squared position with respect to the backing member which was initially established as the sheet 100 rested on the roller 44.

Roller 44 is further raised free of the sheet of film 100 until the roller shaft collars 110 rest in or above the notches 108 at the upper end of the detent lever 106.

Lever 26 is then moved forwardly to rotate the plates 38 and push the backing member 20 forwardly towards the halftone screen 22 until it is in the proper position for exposure of the film.

When the exposure of the film has been completed, lever 26 is moved rearwardly to space the backing member from the screen 22, and then the suction is stopped by actuation of the stop button of switch 126, thereby freeing the sheet of film from the backing member 20 as the air leaks into the suction system, thus completely releasing the sheet of film 100 and allowing it to drop to the bottom interior of the camera where it may be reached through any suitable access door so as to be removed from the camera for development. The camera is thus prepared for another exposure.

The invention in its broader aspects is not limited to the specific mechanisms shown and described but departures may be made therefrom within the scope of the accompanying claims without departing from the principles of the invention and without sacrificing its chief advantages.

What is claimed is:

1. In a photographic camera the combination of a backing member, means for releasably securing a sheet of sensitized material to the surface of the backing member, a member movable vertically adjacent the backing member surface and forming therewith a stop to support the lower edge of the sensitized sheet, and means for pressing the stop member against the sheet as the stop member is raised whereby the sheet is smoothed as it is secured to the backing member surface.

2. A camera as claimed in claim 1 in which a support is provided for a halftone screen and means are provided for moving the backing member toward and away from the halftone screen.

3. In a photographic camera the combination of a backing member, means for feeding a length of sensitized material adjacent the backing member, means for releasably securing a sheet of sensitized material by suction to the surface of the backing member, a roller movable vertically adjacent the backing member surface and forming therewith a stop to support the lower edge of the sensitized sheet, and means for holding the roller stop against the sheet as the roller is raised whereby the sheet is smoothed as it is secured to the backing member surface, and means for interrupting the suction whereby the sheet is released and drops from the surface of the backing member.

4. In a photographic camera, the combination of a backing member, calibrated means for feeding from a supply a measured length of sensitized material adjacent the backing member, means for severing the measured length from the supply, a roller pressed against the surface of the backing member, calibrated means for vertically moving the roller, said roller serving initially to support the severed length of material and thereafter to press the material against the backing member, and a flexible member extending above said roller and forming with the backing member a narrow space to confine the severed material until it is pressed against the surface of the backing member.

5. A camera as claimed in claim 4 in which means are provided for moving the backing member back and forth and latch means are provided for latching the roller in its upper position to prevent inadvertent lowering of the roller.

6. A camera as claimed in claim 4 in which the roller moving means include parallel chains supporting the roller at its ends, and stationary vertically extending trackways are provided to urge the roller towards the backing member.

7. In a photographic camera the combination of a backing member, means for feeding from a supply a measured length of sensitized material adjacent the backing member, means for severing the measured length from the supply, a roller held towards and movable vertically adjacent the backing member surface and forming with a surface or horizontal stop for the lower edge of the sensitized material, means for lowering the position of the roller to center the length of material on the backing member and for raising the position of the roller to press the material against the surface of the backing member, and suction means for releasably securing the material to the backing member.

8. In a photographic camera the combination of a backing member, means for feeding from a supply a measured length of sensitized material adjacent the backing member, means for severing the measured length from the supply, a roller held towards and movable vertically adjacent the backing member surface and forming with said surface a horizontal stop for the lower edge of the sensitized material, means for lowering the position of the roller to center the length of material on the backing member and for raising the position of the roller to press the material against the surface of the backing member, suction means for releasably securing the material to the backing member, flexible guide means secured at an upper end and provided at its other end with take up means for maintaining the flexible guide means taut, a second roller movable with the first roller, positioned above the first roller and around which the guide means runs between its secured end and other end whereby the guide means extends over at least a portion of the backing member surface above the first roller to form a narrow slot with the backing member surface.

9. In a photographic camera the combination of a backing member, means for feeding from a supply a measured length of sensitized material adjacent the backing member, means for severing the measured length from the supply, a roller held towards and movable vertically adjacent the backing member surface and forming with said surface a horizontal stop for the lower edge of the sensitized material, means for lowering the position of the roller to center the length of material on the backing member and for raising the position of the roller to press the material against the surface of the backing member, suction means for releasably securing the material to the backing member, a second roller mounted above the first roller and movable vertically of the backing member, a flexible sheet secured at one end above the normal upper position of the rollers and extending downwardly around the second roller and thence upwardly and forming with the backing member surface a narrow slot into which the sensitized material is fed to the first roller, and means for taking up slack in the flexible sheet as the second roller is vertically moved.

10. A camera as claimed in claim 9 in which the second roller is mounted for vertical movement with the first roller and is moved away from the backing member surface at the upper portion of the vertical movement of the rollers whereby the flexible sheet is closed to the backing member surface when the rollers are in their lower positions.

11. A camera as claimed in claim 10 in which latch means prevent lowering of the rollers and manual means are provided for releasing said latch means.

12. A camera as claimed in claim 9 in which chains are vertically movable and mounted on stationary supports and support the rollers at their ends, and trackways are provided on said supports to urge the rollers towards the backing member.

13. A camera as claimed in claim 9 in which the feeding means and roller moving means are actuated by separate cranks externally of the camera and are also connected with separate indexing means for indicating the extent of their operation.

14. A camera as claimed in claim 9 in which the portion of the flexible sheet extending upwardly from said second roller to the take up means is adjacent the backing member and the portion extending from the secured end to said second roller is away from the backing member, whereby the flexible sheet portion adjacent the backing member moves downwardly twice as fast as the roller is lowered.

15. In a photographic camera having a lens and means for supporting a halftone screen, the combination of a backing member, means for feeding from a supply a measured length of sensitized material to a position between the backing member and screen, means for moving the backing member toward and from the screen, means for severing the measured length from the supply, a horizontal roller normally urged towards the backing member, the roller normally engaging the surface of the backing member and forming a stop against which the severed length of sensitized material is supported, means for lowering and raising the roller, to center the material with respect to the backing member and lens axis as the roller is lowered and to press the material against the surface of the backing member as the roller is raised, means for applying suction to the surface of the backing member to hold the material thereagainst, and a sheet extending above said roller and forming with the backing member a narrow space to confine said severed material.

References Cited in the file of this patent
UNITED STATES PATENTS

| | | |
|---|---|---|
| 2,282,427 | Powers | May 12, 1942 |
| 2,287,271 | Powers | June 23, 1942 |
| 2,584,401 | Thralls | Feb. 5, 1952 |